(12) United States Patent
Siebert et al.

(10) Patent No.: US 11,365,675 B2
(45) Date of Patent: Jun. 21, 2022

(54) GUIDING MECHANISMS FOR MODULAR GENERATOR SET SYSTEM

(71) Applicant: MTU Onsite Energy Corporation, Mankato, MN (US)

(72) Inventors: Joshua John Siebert, Lake Crystal, MN (US); James Dale Carsten, Cleveland, MN (US); Conrad Lewis Dieken, North Mankato, MN (US); Daniel Steven Hoechst, Mankato, MN (US); Kai Michael Vorholz, Palm City, FL (US)

(73) Assignee: MTU Onsite Energy Corporation, Mankato, MN (US)

(*) Notice: Subject to any disclaimer, the term of this patent is extended or adjusted under 35 U.S.C. 154(b) by 45 days.

(21) Appl. No.: 17/069,325

(22) Filed: Oct. 13, 2020

(65) Prior Publication Data
US 2021/0108561 A1   Apr. 15, 2021

Related U.S. Application Data

(60) Provisional application No. 62/914,840, filed on Oct. 14, 2019, provisional application No. 62/914,865, (Continued)

(51) Int. Cl.
*F02B 63/04* (2006.01)
*F16M 1/00* (2006.01)
*F02G 5/02* (2006.01)

(52) U.S. Cl.
CPC .......... *F02B 63/044* (2013.01); *F02B 63/048* (2013.01); *F16M 1/00* (2013.01);
(Continued)

(58) Field of Classification Search
CPC .................. F02B 63/044; F02B 63/048; F02B 2063/045; F16M 1/00; F16M 2200/02; F02G 5/02
See application file for complete search history.

(56) References Cited

U.S. PATENT DOCUMENTS

| 4,136,432 A * | 1/1979 | Melley, Jr. ................ B60P 3/00 29/469 |
| 4,572,474 A * | 2/1986 | Derlich .................... F16M 5/00 248/639 |

(Continued)

FOREIGN PATENT DOCUMENTS

| EP | 2708718 A2 | 3/2014 |
| WO | 2018162915 A1 | 9/2018 |

OTHER PUBLICATIONS

International Search Report and Written Opinion of International Application No. PCT/US2020/055375, dated Dec. 14, 2020, 14 pp.
(Continued)

*Primary Examiner* — Pedro J Cuevas
(74) *Attorney, Agent, or Firm* — Shumaker & Sieffert, P.A.

(57) ABSTRACT

In general, techniques of this disclosure are directed to a modular generator set system. A generator set system may comprise a primary module, which may include an engine, a generator coupled to the engine, a primary frame configured to support the engine and the generator, and a first guiding element. The generator set system may also include a secondary module, a secondary frame, and a second guiding element that is reciprocal to the first guiding element such that, during installation of the secondary module, the second guiding element is configured to interface with the first guiding element to align the secondary module for purposes of automatically electrically or fluidically coupling
(Continued)

the primary module to the secondary module upon assembling the primary frame and the secondary frame.

20 Claims, 9 Drawing Sheets

Related U.S. Application Data filed on Oct. 14, 2019, provisional application No. 62/914,859, filed on Oct. 14, 2019, provisional application No. 62/914,852, filed on Oct. 14, 2019.

(52) U.S. Cl.
CPC .......... *F02B 2063/045* (2013.01); *F02G 5/02* (2013.01); *F16M 2200/02* (2013.01)

(56) References Cited

U.S. PATENT DOCUMENTS

| | | | | |
|---|---|---|---|---|
| 4,660,799 | A * | 4/1987 | Butland | A61B 6/4405 248/676 |
| 4,992,669 | A * | 2/1991 | Parmley | F01B 1/12 290/1 R |
| 5,085,396 | A * | 2/1992 | Mansson | F16M 3/00 248/676 |
| 5,513,759 | A * | 5/1996 | Besserer | F16M 1/00 312/265.2 |
| 5,626,468 | A * | 5/1997 | Muir | F04B 35/002 248/639 |
| 5,820,092 | A * | 10/1998 | Thaler | F24F 13/32 248/676 |
| 6,393,775 | B1 * | 5/2002 | Staschik | F02G 1/043 210/241 |
| 7,021,010 | B2 * | 4/2006 | Smith | E04H 1/1205 296/210 |
| 7,081,682 | B2 * | 7/2006 | Campion | F02B 63/04 123/3 |
| 7,543,793 | B2 * | 6/2009 | Graham | F16M 1/00 290/1 A |
| 7,551,971 | B2 * | 6/2009 | Hillis | H05K 7/20745 267/140.11 |
| 7,608,934 | B1 * | 10/2009 | Hunter | F02D 25/00 290/4 R |
| 7,669,325 | B2 * | 3/2010 | Husted | F04B 35/06 417/234 |
| 7,894,945 | B2 * | 2/2011 | Hillis | H05K 7/20745 361/698 |
| 8,037,658 | B2 * | 10/2011 | Kundel, Sr. | E04C 3/083 52/654.1 |
| 8,082,698 | B2 * | 12/2011 | Drake | B60P 3/34 52/79.5 |
| 8,294,285 | B2 * | 10/2012 | Hunter | F03G 7/08 290/1 R |
| 8,495,869 | B2 * | 7/2013 | Beissler | F01N 13/002 60/275 |
| 8,567,354 | B2 * | 10/2013 | Kealy | F01N 13/04 290/1 A |
| 8,593,002 | B2 * | 11/2013 | Hamm | B65D 47/02 290/1 A |
| 8,689,932 | B2 * | 4/2014 | Dupont | F16M 7/00 181/200 |
| 8,816,518 | B2 * | 8/2014 | Campion | F02B 63/044 290/1 A |
| 8,960,708 | B2 * | 2/2015 | Ziebert | F02B 63/044 123/3 |
| 9,534,370 | B2 * | 1/2017 | Kokoschka | E04H 1/1238 |
| 9,554,482 | B2 * | 1/2017 | Wilson | H02K 7/1815 |
| 9,777,606 | B2 * | 10/2017 | Murai | F02B 63/044 |
| 9,957,708 | B2 * | 5/2018 | Brewer | E04B 1/34336 |
| 9,995,211 | B2 * | 6/2018 | Schmit | F02B 63/044 |
| 10,344,661 | B2 * | 7/2019 | Ikeda | F01P 3/18 |
| 10,458,334 | B2 * | 10/2019 | Davis | F02C 6/14 |
| 10,480,388 | B2 * | 11/2019 | Carmen, Jr. | F02B 75/222 |
| 10,522,801 | B2 * | 12/2019 | Kronke | H01M 50/20 |
| 11,125,156 | B2 * | 9/2021 | Zhang | H02K 7/1823 |
| 2007/0134104 | A1 * | 6/2007 | Husted | F04B 39/12 417/360 |
| 2008/0042625 | A1 * | 2/2008 | Konop | F02B 77/13 322/1 |
| 2010/0060093 | A1 | 3/2010 | Hunter | |
| 2010/0072757 | A1 * | 3/2010 | Kealy | F02B 37/001 290/1 A |
| 2014/0033995 | A1 * | 2/2014 | Kealy | F02B 37/007 123/2 |
| 2015/0176750 | A1 * | 6/2015 | Escobar | A61F 13/15772 248/646 |
| 2018/0287460 | A1 | 10/2018 | Matsuhisa et al. | |
| 2021/0108562 | A1 * | 4/2021 | Siebert | F02B 63/044 |

OTHER PUBLICATIONS

U.S. Appl. No. 17/070,355, filed Oct. 14, 2020, by Siebert et al.
International Preliminary Report on Patentability from International Application No. PCT/US2020/055375, dated Apr. 28, 2022, 8 pp.

* cited by examiner

GUIDING MECHANISMS FOR MODULAR GENERATOR SET SYSTEM

This application claims the benefit of U.S. Provisional Application Ser. No. 62/914,840, entitled "MODULAR GENERATOR SET SYSTEM" and filed on Oct. 14, 2019, U.S. Provisional Application Ser. No. 62/914,852, entitled "ATTACHMENT FEATURES FOR MODULAR GENERATOR SET SYSTEM" and filed on Oct. 14, 2019, and U.S. Provisional Application Ser. No. 62/914,865, entitled "GUIDING MECHANISMS FOR MODULAR GENERATOR SET SYSTEM" and filed on Oct. 14, 2019 and U.S. Provisional Application Ser. No. 62/914,859, entitled "AUTOMATIC COUPLINGS FOR MODULAR GENERATOR SET SYSTEM" and filed on Oct. 14, 2019, the entire contents of each of which is incorporated herein by reference.

TECHNICAL FIELD

The disclosure relates to generator sets.

BACKGROUND

A generator set includes an engine, a generator coupled to the engine, and other optional control systems and accessories that enable the generator set to function to produce electricity. In some examples, many generator sets may be used to provide on-demand backup power for facilities with large power needs, such as datacenters.

DETAILED DESCRIPTION

Figure 1:
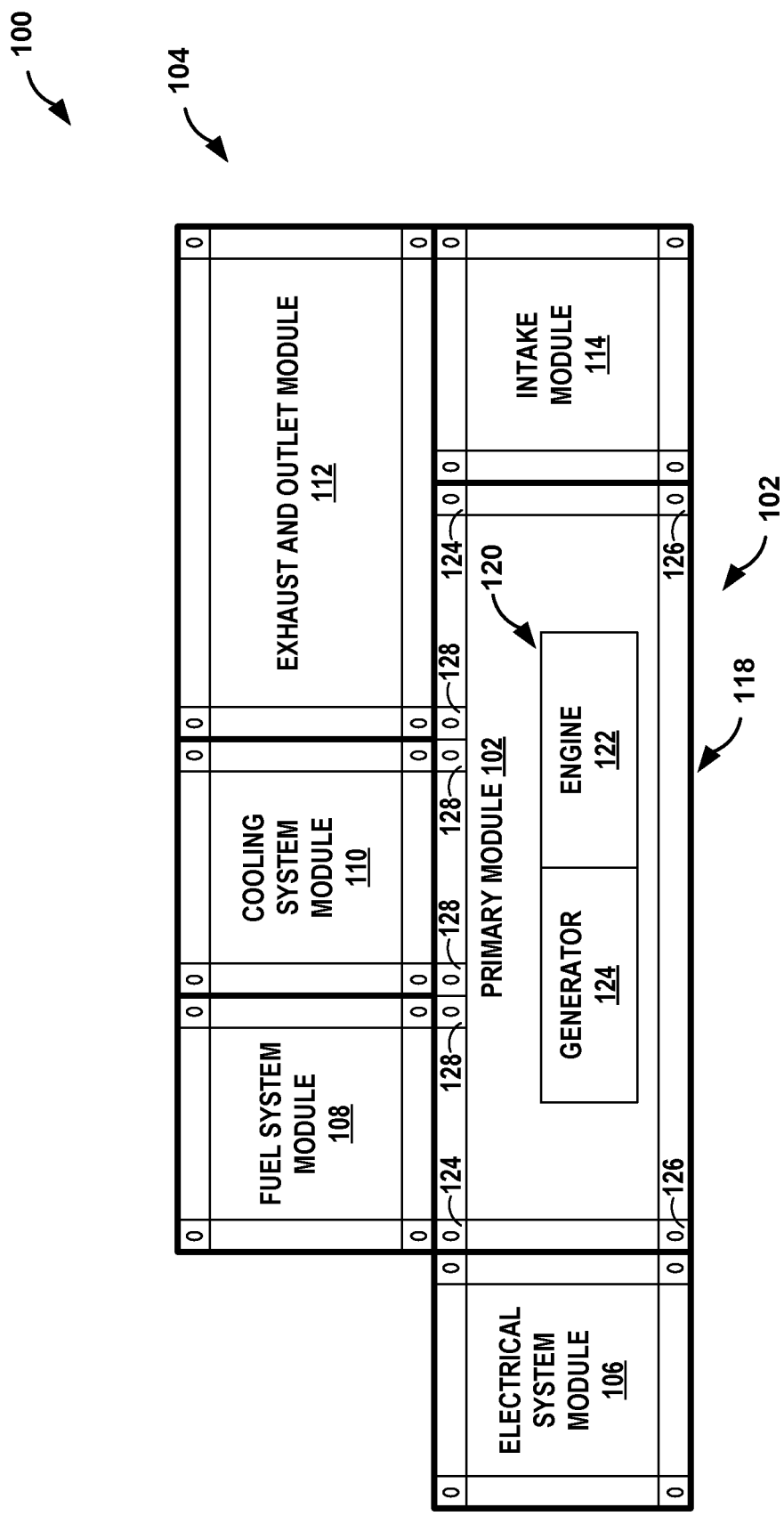
FIG. 1 is a conceptual diagram illustrating a side view of an example modular power generation system, in accordance with one or more techniques of this disclosure.

Power generation may involve the conversion of mechanical energy into electrical energy. For instance, an engine may utilize fuel in a combustion process to generate mechanical energy, which is supplied to a generator via a rotating drive shaft. The generator may convert the mechanical energy into electrical energy. The engine and the generator may be collectively referred to as a "genset."

Gensets may be manufactured in various sizes, type, capacities, etc. In some examples, the gensets may be "bespoke" in that they are custom manufactured for a particular need of a particular customer. This may present one or more disadvantages. As one example, gensets may be relatively large and heavy. As such, the transportation and/or packaging of gensets may be expensive and difficult. Additionally, once the genset is transported to the customer's site, extensive work may be required to install the genset and any support components.

As another example, the custom manufacturing of gensets may introduce long lead-times (i.e., the time from when a genset is ordered to when the genset is installed and capable of producing power). Such long lead times may be undesirable due to increased cost, strained supply chains, delay caused to associated projects, and the like.

As another example, as needs change, a customer may want to add additional generation capacity to a particular site. With gensets being custom manufactured, it may not be possible, or may introduce significant delay, to manufacture and deliver additional gensets to the site that are of the same type as the gensets already at the particular site.

In accordance with one or more techniques of this disclosure, a power generation system may be modularized. An example modular power generation system may include a primary module and one or more secondary modules. The primary module may include an engine and a generator, collectively referred to as a "genset." The secondary modules may include components to support operation of the genset. Example secondary modules include, but are not limited to, heat recovery modules, exhaust modules, cooling system modules, fuel system modules, solar power modules, battery modules, electrical system modules, air intake modules, and air outlet modules.

The modules may be packaged into containers. In some examples, each module may be packaged into its own container. In other examples, multiple modules may be packaged into a single container.

One example container that may be used are intermodal shipping containers that meet the International Organization for Standardization ("ISO") specifications for standard container size and construction (often referred to as ISO shipping containers, and general referred to herein as "ISO intermodal shipping containers," "ISO containers," or "intermodal shipping containers"). Such containers may be manufactured in a limited number of sizes. Common container lengths include ten feet (approximately 9-feet-9.625-inches external) and twenty feet (approximately 19-feet-10.5-inches external) lengths. A standard width for such ISO intermodal shipping containers is eight feet, and a common height is eight-feet-six-inches (standard height containers) or nine-feet-six-inches ("high-cube" containers). One common feature for all ISO intermodal shipping containers is that there is a heavy-duty casting at each of the eight corners that terminate the eight beams (two bottom side rails, two top side rails, a front top rail, a back top rail, a front sill, and a rear sill) and the four columns (two front posts and two rear posts) of the container. Much of the structural integrity of an ISO container may be provided by the eight top and bottom beams and the four vertical columns terminating into the eight corner castings, with additional structural integrity being provided by the use of corrugated walls. The corner castings may also allow the containers to be fastened (e.g., to each other) using a device known as a twist lock fastener; such twist lock fasteners can be manual or automatic (e.g., spring-loaded or the like). The twist lock fastener may allow a container to be secured to a truck flatbed (for shipment to a site), to a base frame or foundation once on-site, and to abutting containers above and below for vertical stacking.

The use of ISO containers for the modular power generation system may present various advantages. For instance, the cost of shipping ISO containers may be significantly less than the cost of shipping uncontained outside cargo. Additionally, the equipment needed to move ISO containers (e.g., trucks, trains, lifts, etc.) may be readily available all over the world. The availability of such equipment may not only reduce shipping/installation costs but may also reduce shipping/installation time.

The modularization of the power generation system may also present various advantages in terms of scalability. For instance, additional capacity may be added to an existing power generation system by simply adding additional primary modules (and any associated secondary modules). In examples, multiple primary modules may be supported by a single secondary module. For instance, a single exhaust module or cooling system module may support multiple primary modules.

FIG. 1 is a conceptual diagram illustrating a side view of an example modular power generation system 100, in accordance with one or more techniques of this disclosure. As shown in FIG. 1, system 100 includes a primary module 102 and secondary modules 104. In the example of FIG. 1, secondary modules 104 include electrical system module 106, fuel system module 108, cooling system module 110, exhaust and outlet module 112, and intake module 114. In other examples, secondary modules 104 may contain additional modules or omit some modules shown in FIG. 1.

System 100 may be utilized in any of a wide variety of cases. As one example, system 100 may be used to provide active or standby power to a datacenter, a cellular communication tower, or the like. As another example, system 100 may operate as a "peaker" plant for an electrical utility. As another example, system 100 may be used to provide power to a temporary facility (e.g., disaster relief, temporary base, etc.). As another example, system 100 may be used to provide power to a portion of a power grid temporarily cutoff from typical generation facilities (e.g., where transmission lines are deactivated due to fire risk).

Primary module 102 may include components configured to convert chemical potential energy in fuel into electrical energy. As shown in FIG. 1, primary module 102 may include housing 118 and genset 120.

Housing 118 may be configured to support other components of primary module 102, such as genset 120. Housing 118 may include a frame with one or more attachment features. As shown in FIG. 1, the attachment features may include upper attachment features 124 and lower attachment features 126. In some examples, such as where housing 118 is an ISO container, upper attachment features 124 and lower attachment features 126 may be ISO compliant castings located at corners of housing 118. For instance, an attachment feature of upper attachment features 124 may be located at each of the four top corners of housing 118. Similarly, an attachment feature of lower attachment features 126 may be located at each of the four bottom corners of housing 118. In some examples, as discussed in further detail below, housing 118 may include one or more additional attachment features 128 located at non-corners of housing 118. In some examples, additional attachment features may be ISO compliant castings. In some examples, housing 118 may include any of wall, ceiling, and floor panels for any of the six sides of housing 118. Where a particular side of housing 118 includes a panel, the panel may or may not be removable.

Primary module 102 includes generator set "genset" 120. Generator set 120 may be configured to produce electrical power using a fuel source, such as diesel, natural gas, gasoline, or the like. Generator set 120 includes engine 122 and generator 124. Generator set 120 may include other components not shown, such as a starter system, and other accessory systems.

Generator 124 may be mechanically coupled to engine 122, such as through a mechanical shaft or any other mechanical link configured to transfer mechanical energy from engine 122 to generator 124. Generator 124 may be configured to convert mechanical energy provided by engine 122 to electrical energy. Generator 124 may include any generator capable of converting the mechanical energy to electrical energy, such as an alternator. Generator 124 may be configured to provide the generated electrical energy to one or more components of system 100, such as electrical system module 106.

Engine 122 may be configured generate mechanical energy from a fuel source and transfer the mechanical energy to generator 124 for conversion into electrical power. Engine 122 may include any engine capable of generating mechanical energy from a fuel source, such as a diesel engine, a gas engine, a turbine, etc. Engine 122 may be fluidically coupled to a fuel source, such as fuel system module 108.

Secondary modules 104 include components configured to support operation of primary module 102. Each of secondary modules 104 may include a housing, which may be similar to housing 118 of primary module 102. For instance, each of secondary module 104 may include a housing in the form of an ISO container. As shown in FIG. 1, some secondary modules 104 may include housings that conform to a different ISO container size than primary module 102.

Primary module 102 and secondary modules 104 may include connectors or couplings to facilitate connections between their respective components. As one example, primary module 120 may include one or more connectors configured to provide power generated by genset 120 to another module, such as electrical system module 106. As another example, primary module 120 may include one or more connectors configured to receive fuel for engine 122 from another module, such as fuel system 108. As another example, primary module 120 may include one or more output connectors and one or more input connectors collectively configured to form a cooling loop with another module, such as cooling system module 110. As another example, primary module 120 may include one or more connectors configured to provide exhaust generated by engine 122 to another module, such as exhaust and outlet module 112. As another example, primary module 120 may include one or more connectors configured to receive air for engine 122 from another module, such as intake module 114.

Electrical system module 106 may include components configured to manage the transfer of electrical power from primary module 102 to an external load. Electrical system module 106 may include switch gear, circuit breakers, and the like. In some examples, instead of being a secondary module 104, the components of electrical system module 106 may be included within primary module 102. In examples in which electrical system module 106 is a secondary module 104, changing a parameter of electricity output by modular power generation system 100, such as an output voltage, may be accomplished by exchanging one electrical system module 106 configured to output electricity at a first voltage with a second electrical system module 106 configured to output electricity at a second, different voltage.

Fuel system module 108 may include components configured to provide fuel for use by engine 122 of primary module 102. Fuel system module 108 may include a fuel tank configured to store the fuel and a pump configured to transfer the fuel from the tank to primary module 102 (e.g., engine 122). In some examples, fuel system module 108 may include components configured to process the fuel before it is provided to primary module 102. For instance, fuel system module 108 may include a fuel polishing system configured to remove or filter microbial contamination or undesirable particulates from the fuel. Example fuels that may be provided by fuel system module 108 include, but are not limited to, diesel fuel, gasoline fuel, biofuel, natural gas, or any other liquid fuel.

Cooling system module 110 may include components configured to dissipate heat generated by at least primary module 102. For example, cooling system module 110 may include a radiator and plumbing that, along with plumbing included within primary module 102, forms a cooling loop that transfers hot coolant from primary module 102 to the radiator and transfers cooled coolant from the radiator back to primary module 102. Any suitable fluid may be used as the coolant, such as water, an alcohol, and the like.

In some examples, cooling system module 110 may be attached to primary module 102. For instance, a housing of cooling system module 110 may by in contact with a housing of primary module 102. In some examples, cooling system module 110 may be located remotely from primary module 102. For instance, a housing of cooling system module 110 may not be in contact with a housing of primary module 102 and may be located outside of a structure in which primary module 102 is located.

In some examples, cooling system module 110 may support a plurality of primary modules. For instance, where system 100 includes multiple primary modules 102, each with its own genset, cooling system module 110 may dissipate the heat generated by more than one of the primary modules.

Exhaust and outlet module 112 may include components configured to handle exhaust gases generated by primary module 112. In some examples, exhaust and outlet module 112 may include a chimney configured to output exhaust gases at a relatively higher position than primary module 102. The height of the chimney may be selected based on various considerations. In some examples, the chimney may be formed by stacking one or more ISO containers vertically on end. In some examples, exhaust and outlet module 112 may include various components configured to treat the exhaust gasses generated by engine 122 of primary module 102. For instance, exhaust and outlet module 112 may include an exhaust gas after treatment (EGAT) module that modifies the composition of the exhaust gases. Example EGAT modules include, but are not limited to, Selective Catalytic Reduction (SCR) modules that use urea (e.g., diesel emission fluid (DEF)) to reduce emissions.

Intake module 114 may include components configured to provide intake air to primary module 102 (e.g., engine 122). Primary module 102 may use the intake air for various purposes, including combustion. Intake module 114 may include a fan, components to filter or otherwise treat the air prior to providing the air to primary module 102, or the like.

Other secondary modules that may be included in secondary modules 104 include, but are not limited to, heat recovery modules, solar power modules, and/or battery modules. A heat recovery module may include components configured to recover heat generated by components of system 100, such as primary module 102, and use the heat for other purposes (such as heating an interior of a building). A solar power module may include photovoltaic panels configured to convert sunlight into electrical power, which may be provided to electrical system module 106. A battery module may include electrical storage devices (e.g., batteries, supercapacitors, flywheels, pumped storage, compressed air, etc.) that may store electricity generated by genset 120 and provide electrical power on-demand (e.g., in addition to or in place of electrical power generated by primary module 102).

As described above, a modular genset may include a primary module and multiple, optional, secondary modules. Since the secondary modules have different functions, the secondary modules include different components. The different components have different sizes, which makes it desirable to mount the components in different frames. However, this may introduce difficulties in assembling the modules and require additional work during assembly. For example, if all components are shipped in 40-foot ISO containers, smaller components may need to be removed from the ISO container and assembled to the primary module by trained welders, electricians, plumbers, or the like. This may increase the cost and complexity of assembly and may increase a time required to construct a modular genset system.

To enable use of different sized modules for different components, a primary module may include a frame that is configured to mechanically support and couple to secondary module frames of different sizes. Such a primary module frame may facilitate assembly of a modular genset system without requiring complicated assembly and/or skilled electricians, plumbers, welders, or other tradespeople. In this way, a primary module frame described herein may reduce skill and cost associated with assembling a modular genset system.

Figure 2A:
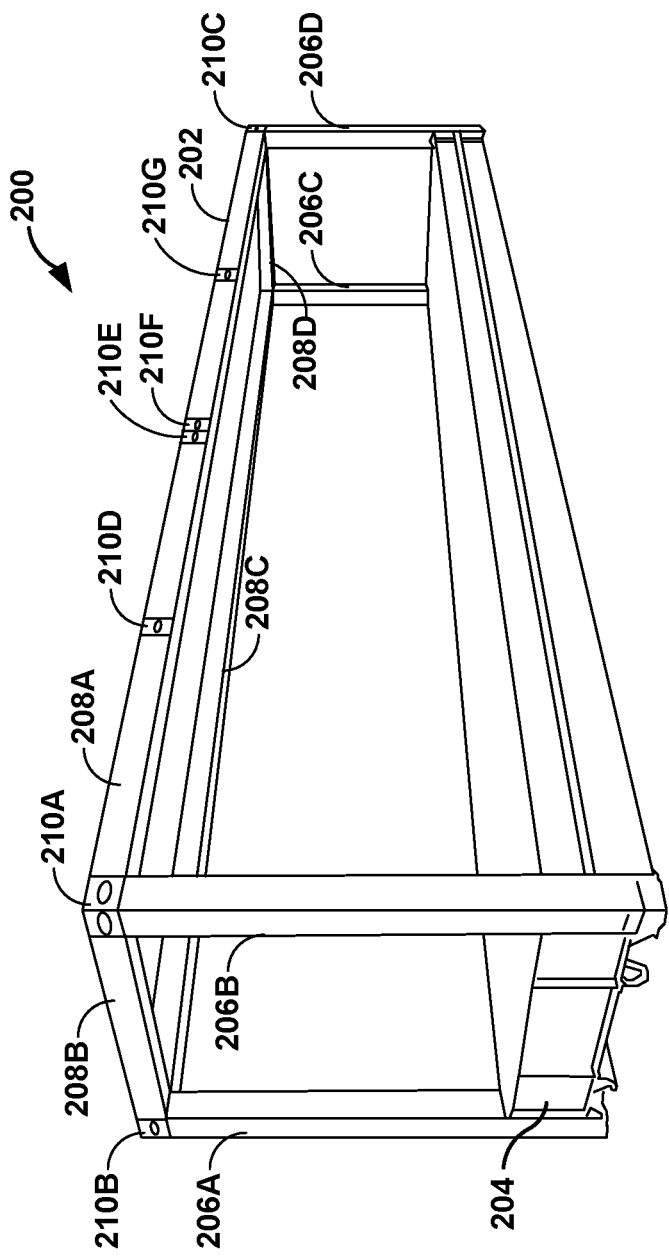
FIG. 2A is a conceptual diagram illustrating a modular generator set ("genset") system including a primary module that includes a frame having a plurality of attachment features.

FIG. 2A is a conceptual diagram illustrating a modular genset system that includes a primary module 200 that includes a frame 202 having a plurality of attachment features 210A-210G (collectively, "attachment features 210"). Attachment features 210 are positioned and configured to attach a frame of a secondary module (which may be referred to as a "secondary frame") to frame 202 of primary module 200 (where frame 202 may be referred to as "primary frame 202"). Primary module 200 may represent one example of primary module 102 discussed in more detail above.

Primary module 200 includes frame 202, which includes a base 204, a plurality of posts 206A-206D (collectively, "posts 206") extending generally vertically from base 204, and a plurality of beams 208A-208D (collectively, "beams 208") joining top ends of posts 206. Although the example of FIG. 2A illustrates a frame 202 including four posts 206, in other examples, frame 202 may include more posts 206, e.g., one or more posts 206 positioned between first post 206A and third post 206C and/or one or more posts 206 positioned between second post 206B and fourth post 206D. Similarly, in some examples, frame 202 may include additional beams 208, e.g., one or more additional beams joining first beam 208A and third beam 208C at an intermediate point(s) between second beam 208B and fourth beam 208D. In other examples, frame 202 may omit beams 208 and may include only posts 206, on which a secondary module may rest. Each of base 204, posts 206, and beams 208 may be formed from any suitable structural material capable of supporting the weight of additional modules stacked on primary module 200, such as wood, steel, aluminum or an aluminum alloy, or the like.

Although not shown in FIG. 2A, primary module 200 may include at least an engine and a generator, as shown in FIG. 1. The engine and generator may be fixed, coupled, or otherwise attached to base 204 and/or beams 206 of frame 202. In this way, frame 202 is configured to support the engine and the generator.

Frame 202 may include either a wall-less shipping container (such as shown in the example of FIG. 2A) or walled shipping container (either of which may also be referred to as a "skid") of established dimensions (e.g., standard International Standards Organization—ISO—sizes, such as eight feet wide by forty feet or twenty feet or ten feet or eight feet long, and eight and half feet high). In some examples, frame 202 is configured to couple to removable side panels (not shown in FIG. 2A). The removable side panels may be configured to enclose the engine and the generator during transport and configured to be removed prior to mechanically coupling a secondary module to frame 202 of primary module 200.

Frame 202 includes a plurality of attachment features 210. Plurality of attachment features 210 are positioned and configured to attach a frame of a secondary module to frame 202 of primary module 200. As shown in FIG. 2A, attachment features 210 may be positioned at selected locations around posts 206 and/or beams 208. For example, a respective attachment feature of attachment features 210 may be positioned at each top corner of frame 202 (e.g., at the top end of each post of posts 206). Additional attachment features 210 may be disposed at selected locations along beams 208A and 208C. For example, two attachment features 210E and 210F may be located approximately halfway along the length of beam 208A (and corresponding attachment features may be located approximately halfway along the length of beams 208C). As another example, one or two attachment features (e.g., attachment feature 210D) may be located approximately a quarter of the way along the length of beam 208A (and one or two corresponding attachment features may be located approximately a quarter of the way along the length of beams 208C), and one or two attachment features (e.g., attachment feature 210G) may be located approximately three-quarters of the way along the length of beam 208A (and one or two corresponding attachment features may be located approximately three-quarters of the way along the length of beams 208C).

The locations of respective attachment features may be selected to enable coupling of secondary modules of different sizes to frame 202. For example, frame 202 may substantially conform to 40-foot ISO container dimensions, and a secondary module may conform to 40-foot ISO container dimensions, 20-foot ISO container dimensions, 10-foot ISO container dimensions, or 8-foot ISO container dimensions. By including attachment features 210 at intermediate positions along the length of frame 202, secondary modules having different dimensions may be attached to frame 202 to secure the secondary module to frame 202.

In other words, a first set of attachment features (210A, 210B, 210C, and the corresponding attachment feature at the other top corner of frame 202) from the plurality of attachment features 210 is positioned on frame 202 to mechanically couple a frame of a first type of secondary module having substantially the same dimensions as primary module 200 to frame 202 of primary module 200. Frame 202 also includes at least one other set of attachment features that is positioned on 202 frame to mechanically couple a frame of a second type of secondary module having different dimensions than primary module 200 to the frame 202 of primary module 200. One such set of attachment features 210 may include first attachment feature 210A, second attachment feature 210B, fourth attachment feature 210D, and a corresponding attachment feature on third beam 208C. This set of attachment features may be positioned to allow attachment of a skid substantially conforming to 10-foot ISO container dimensions to frame 202. Another such set of attachment features 210 may include first attachment feature 210A, second attachment feature 210B, fifth attachment feature 210E, and a corresponding attachment feature on third beam 208C. This set of attachment features may be positioned to allow attachment of a skid substantially conforming to 20-foot ISO container dimensions to frame 202. In this way, frame 202 includes a plurality of attachment features 210 positioned on frame to allow mechanical coupling or attachment of secondary modules of different sizes.

Figure 2B:
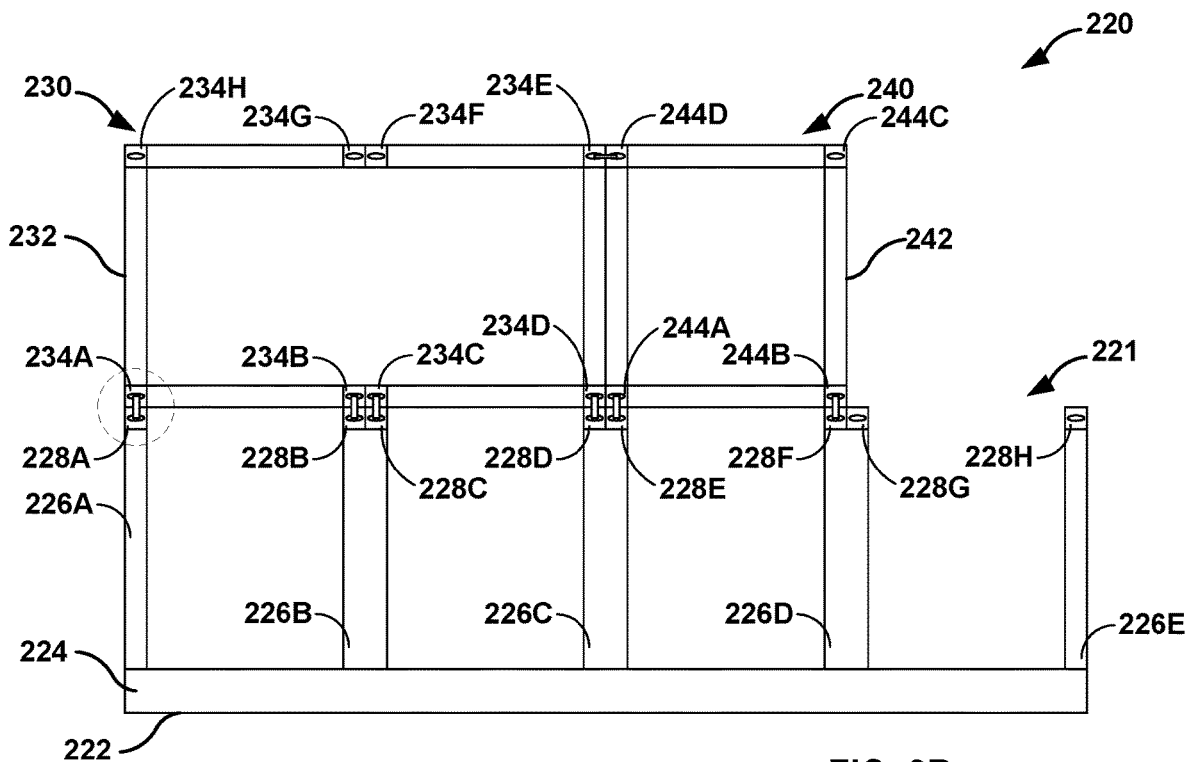
FIG. 2B is a conceptual diagram illustrating a modular genset system that includes a first type of secondary module mechanically coupled to a frame of a primary module and a second type of secondary module mechanically coupled to the frame of the primary module.

FIG. 2B is a conceptual diagram illustrating a modular genset system 220 that includes a first type of secondary module 230 mechanically coupled to a frame 222 of a primary module 221 and a second type of secondary module 240 mechanically coupled to frame 222 of primary module 221. Primary module 220 may represent one example of primary module 102 discussed in more detail above, and secondary modules 230, 240 may represent examples of secondary modules 104 discussed in more detail above.

Primary module 221 includes frame 222, which includes base 224 and posts 226A-226E. Frame 222 may include corresponding posts on a backside of frame 222. In the example shown in FIG. 2B, frame 222 omits beams that join top ends of posts 226. In other examples, frame 222 may include beams like frame 202 of FIG. 2A. Although frame 222 includes ten posts 226 (the five posts 226 shown in FIG. 2B and five corresponding posts 226 on a backside of frame 222), frame 222 may include any suitable number of posts 226.

Each of posts 226 includes one or more attachment features 228A-228H (collectively, "attachment features 228") at or near a top end of posts 226. For example, first post 226A includes first attachment feature 228A, second post 226B includes second attachment feature 228B and third attachment feature 228C, third post 226C includes fourth attachment feature 228D and fifth attachment feature 228E, fourth post 226D includes sixth attachment feature 228F and seventh attachment feature 228G, and fifth post 226E includes eight attachment feature 228H. The corresponding posts 226 on the backside of frame 222 include corresponding attachment features 228.

Posts 226 and attachment features 228 are positioned on frame 222 to support and mechanically couple secondary modules having selected sizes. Two examples are shown in FIG. 2B. For example, a first type of secondary module 230 includes a frame 232 having a length that is substantially equal to half the length of frame 222. First type of secondary module 230 includes a plurality of attachment features 234A-234H (collectively, "attachment features 234"), located at positions corresponding to positions of attachment features 228 on frame 222. In this way, attachment features 234 and attachment features 228 may be mechanically coupled to attach frame 232 of the first type of secondary module 230 to frame 222 of primary module 220. Although FIG. 2B illustrates an example in which frame 232 of the first type of secondary module 230 includes a corresponding attachment feature for each attachment feature of frame 222 that is adjacent to frame 232, in other examples, frame 232 may omit one or more attachment features (e.g., second and third attachment features 234B and 234C and corresponding attachment features on the posts 226 on the backside of frame 222).

As another example, a second type of secondary module 240 includes a frame 242 having a length that is substantially equal to one quarter of the length of frame 222. Second type of secondary module 240 includes a plurality of attachment features 244A-244D (collectively, "attachment features 244"), located at positions corresponding to positions of attachment features 228 on frame 222. In this way, attachment features 244 and attachment features 228 may be mechanically coupled to attach frame 242 of the second type of secondary module 240 to frame 222 of primary module 220.

Figure 2C:
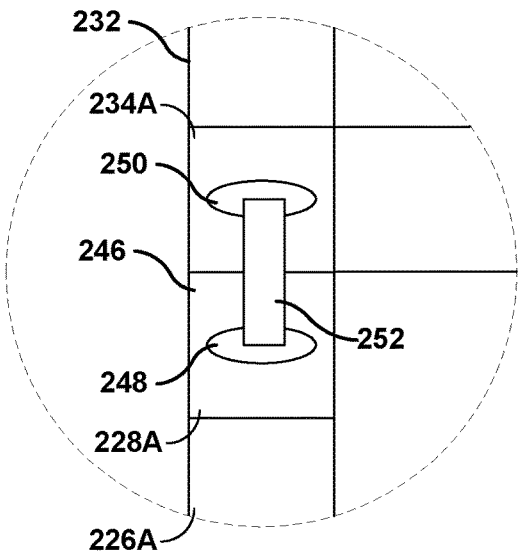
FIG. 2C illustrates an enlarged portion of FIG. 2B.

FIG. 2C illustrates an enlarged portion of FIG. 2B. As shown in FIG. 2C, each attachment feature of the plurality of attachment features 228 of frame 222 (and, optionally of frame 232 and 242) includes a mechanical support 246 configured to mechanically support frame 232 of secondary module 230 and a coupling feature 248 configured to mechanically lock frame 232 of secondary module 230 to frame 222 of primary module 221. Similarly, attachment feature 234A of frame 232 includes a coupling feature 250.

In some examples, coupling features 248, 250 may include apertures formed in attachment features 228, 234 that are configured to receive a locking mechanism. The locking mechanism may be configured to restrain frame 232 relative to frame 222. The locking mechanism may include, for example, a cotter pin, a clamp, a double ended twist lock, or the like. In other examples, coupling feature 248 and coupling feature 250 may include complementary shapes such that coupling feature 250 engages coupling feature 248 to restrain or retain frame 232 relative to frame 222. For example, coupling feature 250 may include a protrusion and coupling feature 248 a depression or aperture configured to receive the protrusion, and the mating of the protrusion and depression or aperture may restrain frame 232 relative to frame 222.

While frame 202 and 222 including attachment features 210 and 228 may facilitate mechanical coupling or attaching of secondary modules 230, 240 to a primary module 200, 221, electrical and fluidic (e.g., fuel, air intake, exhaust, cooling) connections may still require skilled electricians and/or plumbers. Like mechanical assembly of modules, this may delay construction or increase cost of constructing modular genset systems, particularly for modular genset systems that are located in relatively remote locations.

Figure 3:
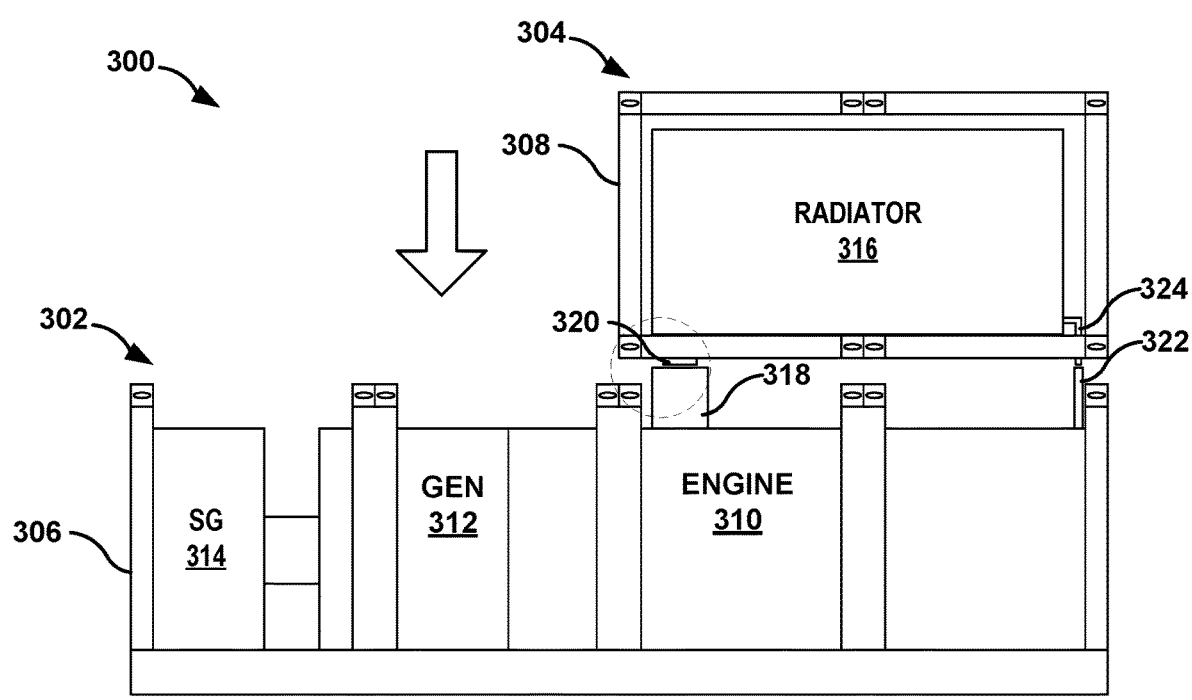
FIG. 3 is a conceptual diagram of a genset system that includes a primary module and a secondary module, in which the primary module and secondary module include couplings configured to automatically electrically and/or fluidically couple the primary module to the secondary module upon assembling a frame of the primary module and a frame of the secondary module.

FIG. 3 is a conceptual diagram of a genset system 300 that includes a primary module 302 and a secondary module 304, in which the primary module 302 and secondary module 304 include couplings 318, 320, 322, 324 configured to automatically electrically or fluidically couple primary module 302 to secondary module 304 upon assembling a frame 306 of primary module 302 and a frame 308 of secondary module 304.

Like primary module 200, 221 of FIGS. 2A-2C, primary module 300 includes a frame 306, which may be similar to or substantially the same as any of the frames described herein. Similarly, secondary module 304 includes a frame 308, which may be similar to or substantially the same as any of the frames described herein.

Primary module 300 includes an engine 310, generator 312, and switch gear 314. Each of these may be similar to or substantially the same as corresponding components described above. In the example of FIG. 3, secondary module 304 includes a radiator 316, although the concepts illustrated in FIG. 3 are equally applicable to any of the secondary modules described herein (e.g., a heat recovery module, an exhaust module, a cooling system module, a fuel system module, a solar power module, a battery module, an electrical system module, an air intake module, an air outlet module, or the like).

In order for radiator 316 to receive power from and exchange working fluid with primary module 302 (e.g., engine 310 and generator 312), radiator 316 must be electrically and fluidically connected to primary module 302. In some implementations, this may require a professional electrician, plumber, or other skilled tradesperson to install radiator to engine 310. In accordance with techniques of this disclosure, primary module 302 and secondary module 304 including couplings 318, 320, 322, 324 that are configured to automatically electrically or fluidically couple primary module 302 to secondary module 304 upon assembling primary frame 306 and secondary frame 308.

Primary module 318 may include a first coupling 318 and a third coupling 322. First coupling 318 is configured to fluidically couple primary module 302 (e.g., engine 310) to second module 304 (e.g., radiator 316). Third coupling is configured to electrically couple primary module 302 (e.g., generator 312 or switch gear 314) to second module 304 (e.g., radiator 316). Secondary module 304 includes complementary second coupling 320 and fourth coupling 324.

First coupling 318 is positioned relative to frame 306 of primary module 302 and second coupling 320 is positioned relative to frame 308 of secondary module 304 so that first coupling 318 automatically engages second coupling 320 upon assembling frame 306 and frame 308. Similarly, third coupling 322 is positioned relative to frame 306 of primary module 302 and fourth coupling 324 is positioned relative to frame 308 of secondary module 304 so that third coupling 322 automatically engages fourth coupling 324 upon assembling frame 306 and frame 308. In this way, first and second couplings 318 and 320 are positioned at complementary locations of frames 306 and 308, and third and fourth couplings 322 and 324 are positioned at complementary locations of frames 306 and 308.

Third and fourth couplings 322 and 324 include first and second electrical couplings. The first electrical coupling and the second electrical coupling are configured to electrically couple primary module 302 to secondary module 304 automatically upon assembling the frame 306 and frame 306. In some examples, the first electrical coupling and the second electrical coupling are configured to provide an electrical power connection between primary module 302 and secondary module 304, e.g., to power radiator 316, such as a pump, fan, or the like. In some examples, the first electrical coupling and the second electrical coupling are configured to additionally or alternatively provide an electrical communication connection between primary module 302 and secondary module 304, e.g., to allow primary module 302 to control operation of radiator 316.

In the example of FIG. 3, one of the first electrical coupling or the second electrical coupling comprises a male connector and the other of the first electrical coupling or the second electrical coupling comprises a female connector. For example, third coupling 322 may be a female connector and fourth coupling 324 may be a male connector. In some examples, the first electrical coupling and the second electrical coupling are configured to engage in a friction fit to make electrical connection. In some examples, the first electrical coupling and the second electrical coupling are configured to engage in a spring-loaded fit to make electrical connection. In some implementations, third coupling 322 and fourth coupling 324 include one or more locking features (e.g., clips, tabs, depressions, or the like), and the first electrical coupling and the second electrical coupling are configured to lock to each other upon electrical coupling.

First and second couplings 318 and 320 include first and second fluidic couplings. The first fluid coupling and the second fluid coupling are configured to automatically fluidically couple primary module 302 to secondary module 304 upon assembling frame 306 and frame 308. In the example of FIG. 3, first and second couplings 318 and 320 fluidically connect engine 310 and radiator 316. For example, first and second couplings 318 and 320 fluidically connect a cooling circuit of engine 310 through which cooling fluid flows to a fluid circuit of radiator 316. In other examples, fluid connections may be made between modules for a fuel line, an exhaust conduit, a heat exchanger working fluid line, or an air conduit.

As fluid flows through the connection made by first and second couplings 318 and 320, at least one of first or the second couplings 318 or 320 may include comprises a sealing feature configured to make a fluid-tight seal between the first and the second fluid couplings 318 and 320. For example, the sealing feature may include an o-ring, a rubber or plastic flange, or the like, that deforms upon coming into contact with a complementary surface or feature to form a fluid-tight seal between first and second couplings 318 and 320. As such, first and second couplings 318 and 320 may be sized and positioned such that first and second couplings 318 and 320 come into tight contact upon frame 308 contacting frame 306.

In some examples, couplings 318 and/or 322 may be attached to frame 306 of primary module 302 near one of the attachment features (shown but not labelled in FIG. 3). This may provide mechanical support for the couplings 318 and/or 322, thus resisting movement of couplings 318 and/or 322 during the assembly process and making assembly more robust and predictable. Similarly, couplings 320 and 324 may be attached to frame 308 of secondary module 304 near one of the attachment features (shown but not labelled in FIG. 3).

Figure 4A:
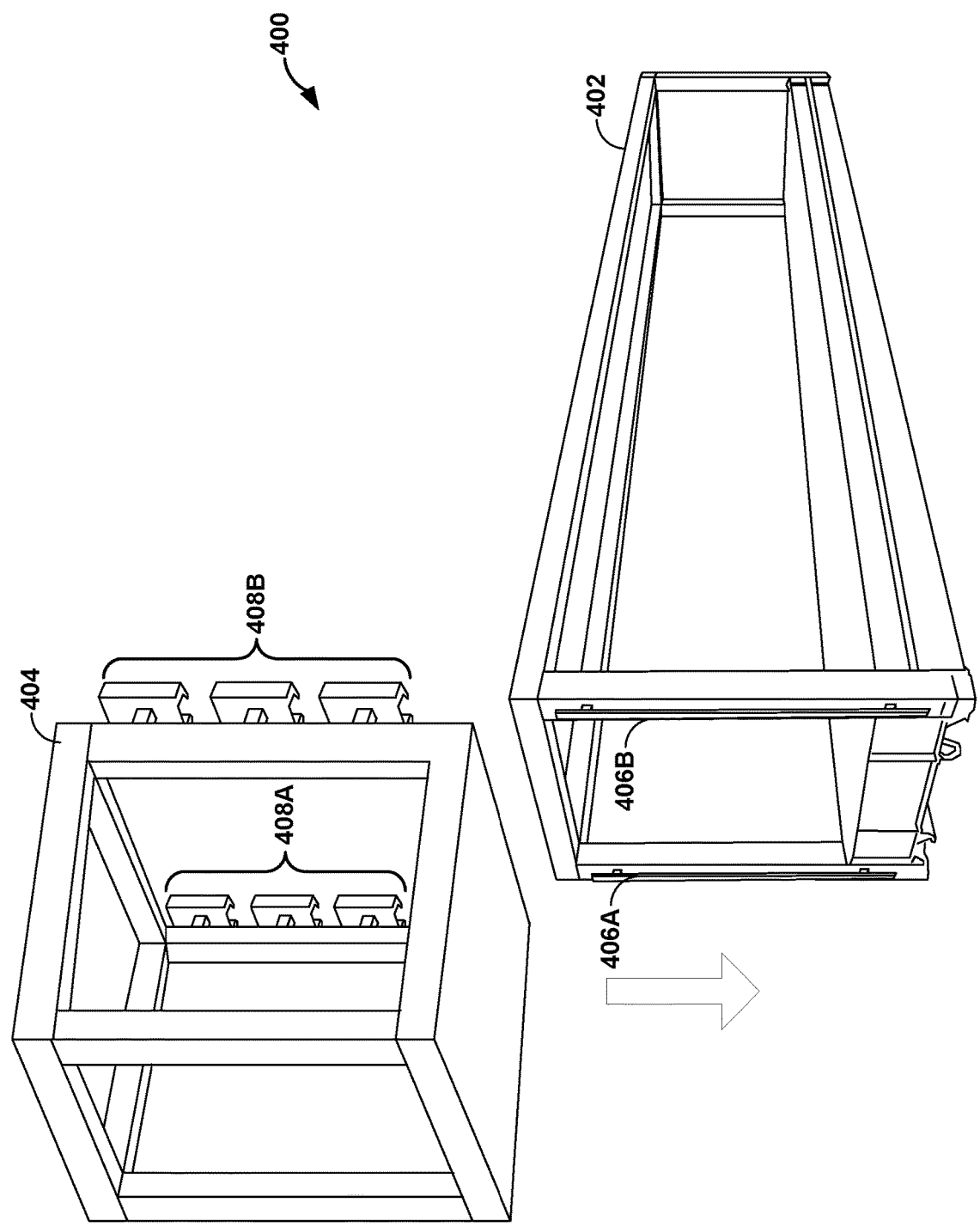
FIG. 4A is a diagram illustrating a modular genset having guiding elements by which to guide a primary frame relative to a secondary frame in accordance with various aspects of the techniques described in this disclosure.

FIG. 4A is a diagram illustrating a modular generator set ("genset") having guiding elements by which to guide a primary frame relative to a secondary frame in accordance with various aspects of the techniques described in this disclosure. As shown in the example of FIG. 4A, a modular genset system 400 may include a primary frame 402 and a secondary frame 404. Modular genset system 400 may represent one example of modular genset system 100 discussed in more detail above.

That is, as discussed above, a primary module may include primary frame 402, as well as an engine and a generator coupled to the engine and configured to convert mechanical energy of the engine to electrical energy. In some instances, the engine and generator may be fixed, coupled, or otherwise attached to primary frame 402 prior to shipping to a customer. Primary frame 402 may include either a wall-less shipping container (such as shown in the example of FIG. 4A) or walled shipping container (either of which may also be referred to as a "skid") of established dimensions (e.g., standard International Standards Organization—ISO—sizes, such as eight feet wide by forty feet or twenty feet or ten feet or eight feet long, and eight and half feet high).

A secondary module may include secondary frame 404 as well as one or more modules, such as the above described heat recover module, exhaust module, cooling module, fuel system module, solar power module, battery module, electrical system module, air intake module, or air outlet module. Any one or more of the above modules may be fixed, coupled, or otherwise attached to secondary frame 404.

Secondary frame 404 may include either a wall-less skid (such as shown in the example of FIG. 4A) or walled skid of various dimensions (e.g., standard ISO dimensions or smaller or larger dimensions depending on the one or more modules fixed, coupled or otherwise attached to the skid). For example, secondary frame 404 may be eight feet wide, twenty feet or ten feet or eight feet long, and eight and a half feet tall when supporting an electrical system module. Depending on the placement of the module, secondary frame 404 may define different dimensions to accommodate the placement of the module relative to primary frame 402 to enable automatic electrical or fluidical coupling of the primary module to the secondary module.

As modular genset system 100 provides automatic electrical or fluidical coupling of the primary module to the secondary module, placement of the primary module relative to the secondary module may require precision and accuracy to ensure that electrical or fluidical couplings align with one another. In some instances, placement of the primary module (or more specifically, primary frame 402) relative to the secondary module (or more specifically, secondary frame 404) that results in even small offsets between couplings may damage couplings (such as breaking or otherwise bending male electrical connectors on a housing of a female connector or damaging fluidical couplings, such as hoses, clamps, vents, etc.).

Furthermore, due to this damage, modular genset system 400 may experience leaks (due to damaged fluidical couplings). Such damage may, in addition, require reworking of the modules that requires soldering (for electrical couplings), replacement parts (for damaged or broken electrical or fluidical couplings), and other specialized work (that can drive up costs, especially in remote locations such as large data centers located in remote, geographically stable areas with low electricity costs—such as next to remote dams).

In accordance with various aspects of the techniques described in this disclosure, primary frame 402 may include attachment points (not shown) by which to affix, couple, or otherwise attach guiding elements 406A and 406B by which to guide installation of the secondary module relative to the primary module. Guiding elements 406A and 406B are shown as a rail which guide reciprocal guiding elements 408A and 408B, where guiding elements 408A and 408B are shown as carriages. Secondary frame 404 may also include attachment points (not shown) by which to affix, couple or otherwise attach guiding elements 408A and 408B.

As such, during installation of the secondary module (e.g., by lowering the secondary module using a crane, fork lift or other type of equipment in place next to the primary module), guiding elements 408A and 408B may interface with respective guiding elements 406A and 406B to align the secondary module for purposes of automatically electrically or fluidically coupling the primary module to the secondary module upon assembling the primary frame and the secondary frame. As such, guiding elements 406A and 406B ("guiding elements 406") and guiding elements 408A and 408B ("guiding elements 408") may enable accurate alignment of the secondary module relative to the primary module and potentially reduce damage or other issues (such as specialized work, including soldering, fluidic routing—installation of complicated hoses, pipes, vents, etc., and the like, thereby possibly reducing costs associated with assembly of modular genset system 400).

In the example of FIG. 4A, guiding elements 406 are shown as a linear rail over which the carriages represented by guiding elements 408 couple and then slide as the secondary module is lowered down into place. Guiding elements 408 may be configured to restrict movement (in three dimensions) of the secondary module relative to the primary module. Once lowered into place, guiding elements 408 may, due to restricting movement (in three dimensions) relative to guiding elements 406, various fitting, attachment points, outlets, inlets or other aspects of the modules installed on primary frame 402 and secondary frame 404 may align, allowing for automatic electrical or fluidical coupling of the secondary module to the primary module (which may involve some manual installation of couplings, rings, fasteners—such as screws, clamps, etc., but little to no specialized work, such as soldering, metal workings, plumbing, etc.).

Although shown as a linear rail with mechanical carriage, guiding elements 406 may include any type of guide rail, including slides, telescoping slides, shafts, etc., and reciprocal guiding elements 408 may include any type of carriage, such as ball bearing carriages, sleeve bearing carriages, track roller carriage, roller bearing carriages, etc. Further, reciprocal guiding elements 408 may include way wipers to clean or otherwise ensure proper operation of the carriage (e.g., by preventing dust or other debris from entering the carriage and damaging bearings) while also ensuring guiding elements 406 remain smooth to retain proper operation.

Although described above as being attached at one end of primary frame 402, guiding elements 406 may be placed in a number of different locations as discussed below with respect to FIGS. 4B-4E. FIGS. 4B-4E are diagrams illustrating positioning of guiding elements with respect to a primary module of a modular genset system in accordance with various aspects of the techniques described in this disclosure.

Figure 4B:
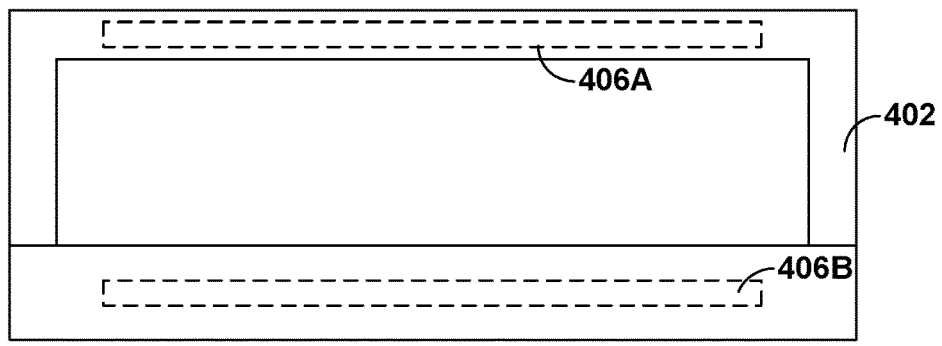
FIGS. 4B-4E are diagrams illustrating positioning of guiding elements with respect to a primary module of a modular genset system in accordance with various aspects of the techniques described in this disclosure.
Figure 4C:
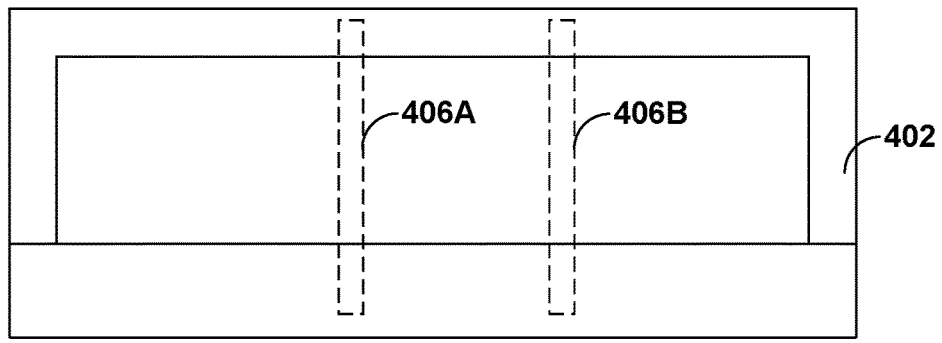
Figure 4D:
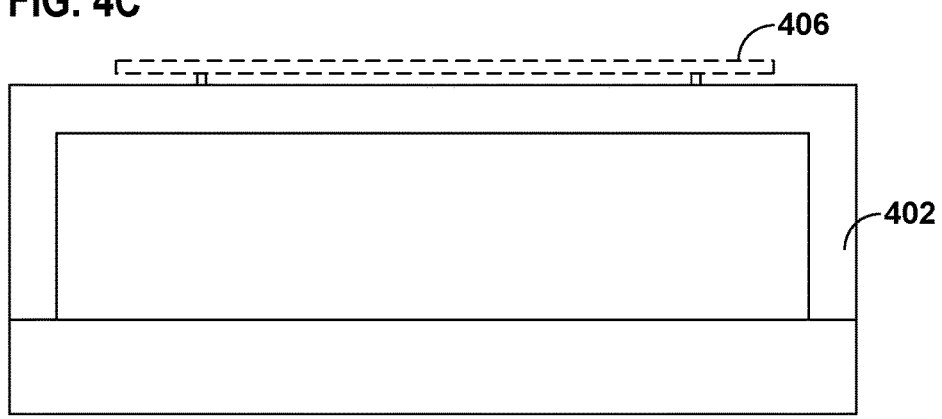

Referring first to the example of FIG. 4B, guiding elements 406 are mounted horizontally across a side of primary frame 402, while in the example of FIG. 4C, guiding elements 406 are mounted vertically across the middle of a side of primary frame 402. In the example of FIG. 4D, guiding elements 406 (although only one is shown as one of the guiding elements 406 is not visible in the cross-sectional view depicted in the example of FIG. 4D) are mounted on top of primary frame 402.

Figure 4E:
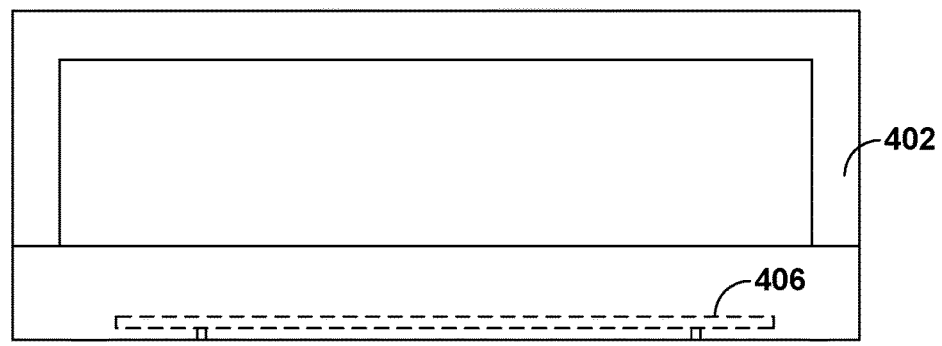

Although described above as being mounted (which may refer to attaching, affixing or otherwise coupling) guiding elements 406 to primary frame 402, guiding elements 406 may be attached to other surfaces not associated with modular genset system 400, such as a ceiling, wall, floor, or any other surface capable of supporting stresses associated with assembling modular genset system 400. In the example of FIG. 4E, guiding elements 406 (although only one is shown as one of the guiding elements 406 is not visible in the cross-sectional view depicted in the example of FIG. 4E) are attached to a floor next to primary structure 402 to permit the secondary module to be guided relative to primary frame 402.

Reciprocal guiding elements 408 may (although not shown in any of the examples of FIGS. 4B-4E for ease of illustration purposes) be attached or otherwise deployed in a reciprocal location. In the example of FIG. 4B, guiding elements 408 may be installed on or deployed along secondary frame 404 at the top and bottom in a horizontal manner to permit alignment and engagement with guiding elements 406. In the example of FIG. 4C, guiding elements 408 may be installed on or deployed at secondary frame 404 in a vertical manner to permit alignment and engagement with guiding elements 406. In the examples of FIGS. 4D and 4E, guiding elements 408 may be installed on or deployed at secondary frame 404 on the bottom to permit alignment and engagement with guiding elements 406.

Moreover, although described as being installed with respect to primary frame 402 and secondary frame 404 (e.g., during assembly of primary frame 402 and secondary frame 404), guiding elements 406, 408 may be pre-installed and deployed (e.g., fold out) with respect to primary frame 402 and secondary frame 404. As such, guiding elements 406 may be folded out from primary frame 402, while guiding elements 408 may be folded out from secondary frame 404.

Figure 4F:
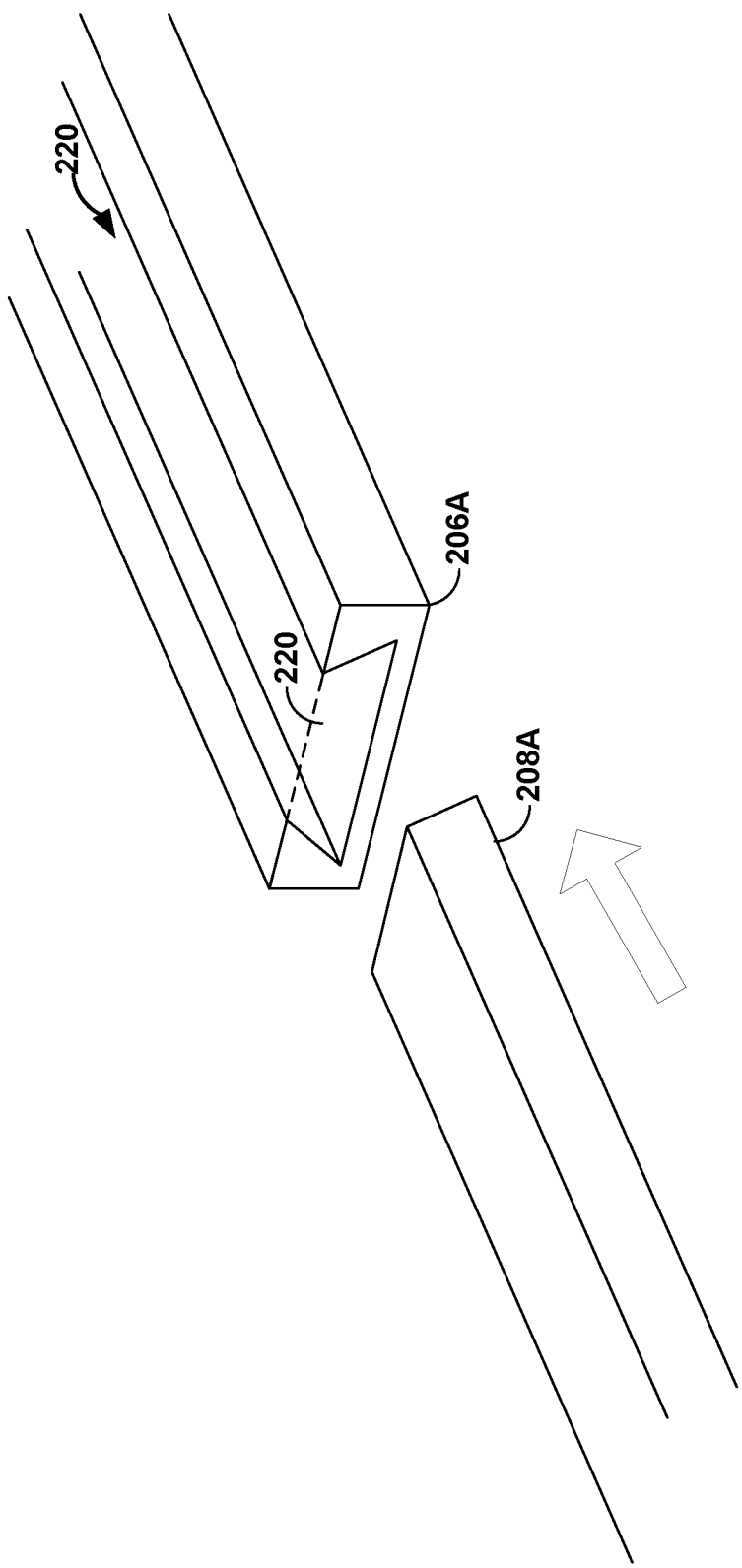
FIG. 4F is a diagram illustrating a guiding element that inserts into a slot or groove of guiding element in accordance with various aspects of the techniques described in this disclosure.

Although described with respect to carriages that surround guiding element 406, guiding element 408 may be inserted into a slot or groove of guiding element 406. FIG. 4F is a diagram illustrating a guiding element that inserts into a slot or groove of guiding element in accordance with various aspects of the techniques described in this disclosure. As such, guiding element 406A includes a slot or groove 420. In the example of FIG. 4F, groove 420 is shown as a trapezoidal groove running the length of a slot rail 406A (which is one example of guiding element 406A). Guiding element 408A is a reciprocal trapezoidal shape to ensure reciprocal interaction with guiding element 406A, although slightly smaller to potentially reduce friction.

Although described as including a trapezoidal shape, guiding element 406A may include any type of shape or construction to facilitate or ease coupling or securing of the reciprocal guiding element 408A. For example, guiding element 408A may include a rounded shape, a square shape, a star shape, etc. In addition, guiding element 406A may include various flare outs or other opening to ease coupling and/or securing of the reciprocal guiding element 408A.

Figure 4G:
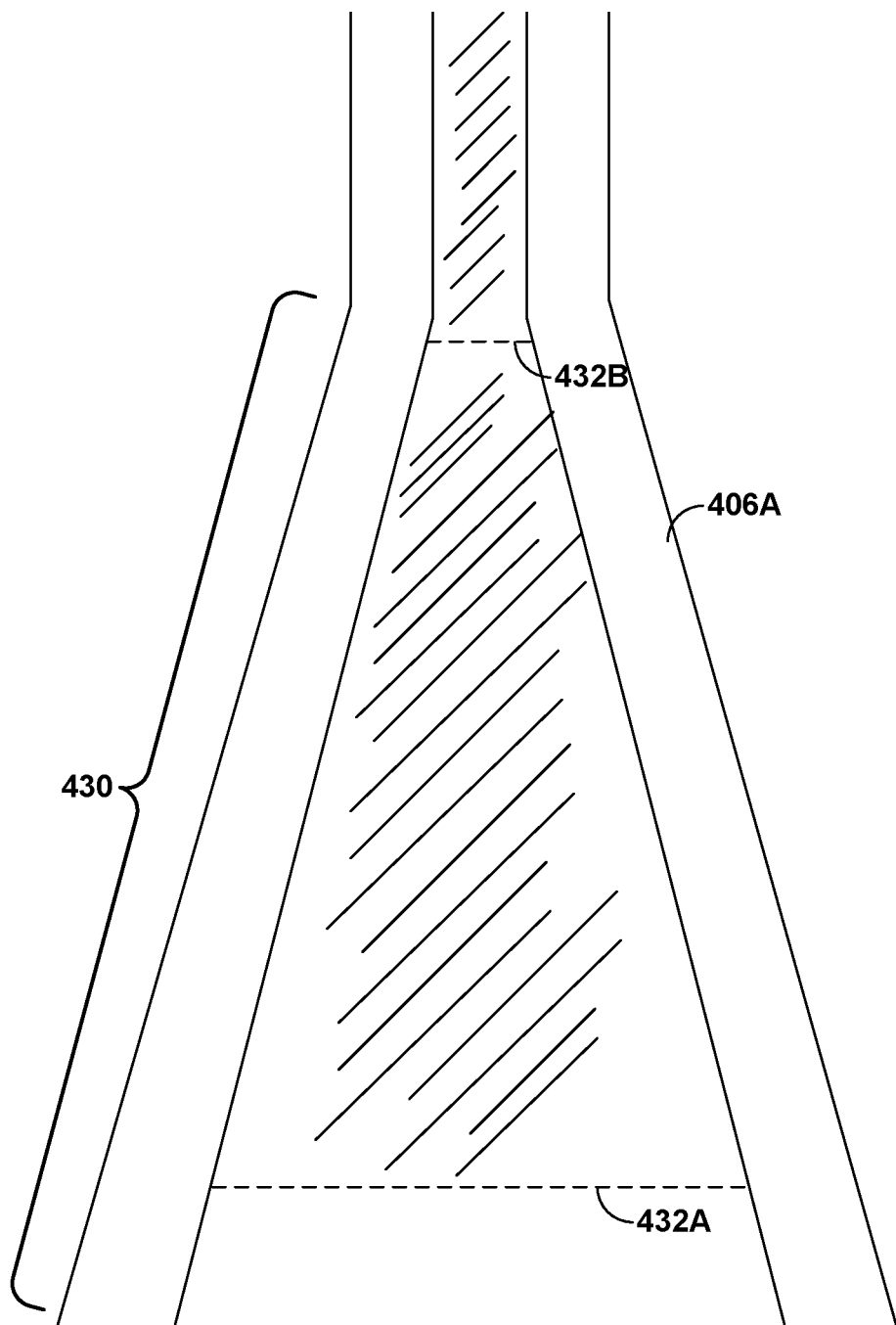
FIG. 4G is a diagram illustrating a guiding element that includes a flared element to facilitate entry and exit of a corresponding guiding element in accordance with various aspects of the techniques described in this disclosure.

FIG. 4G is a diagram illustrating a guiding element that includes a flared element to facilitate entry and exit of a corresponding guiding element in accordance with various aspects of the techniques described in this disclosure. In the example of FIG. 4G, guiding element 406A includes a flare end 430 that facilitates entry and/or exit of corresponding guiding element 408A. That is, at the terminating end of guiding element 406A, flare end 430 is wider (having a width 432A) than at the joining end of guiding element 406A (having a width 432B that is smaller than width 432A, as shown in the top-down view in the example of FIG. 4G). Although only a single end is shown and such end flares out, guiding element 406A may include flared or tapered ends, or any other type of end that may facilitate engaging with reciprocal guiding element 408A.

Figure 5:
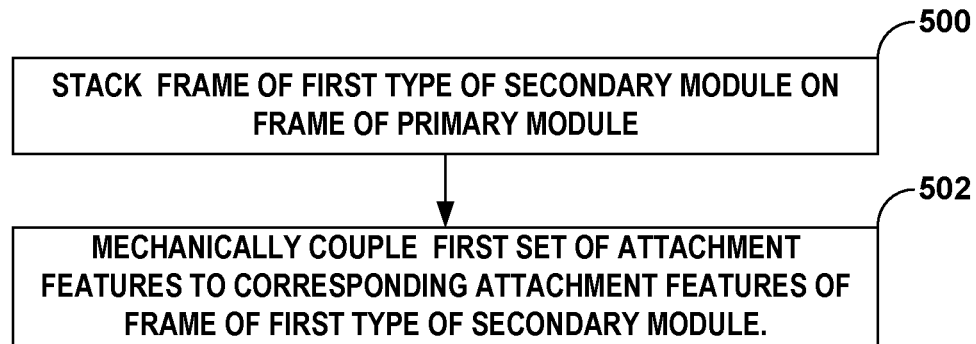
FIG. 5 is a flowchart illustrating example operation of the modular generator set system shown in the examples of FIGS. 1-4G.

FIG. 5 is a flowchart illustrating example assembly of the modular generator set system shown in the examples of FIGS. 1-4G. The operator may initially stack a frame 202

(FIG. 4A) of a first type of secondary module 102 on a frame 202 (FIG. 2A) of a primary module 102 (FIG. 1) (500). Primary module 102 may include an engine 122, a generator 124 coupled to engine 122 and configured to convert mechanical energy of engine 122 to electrical energy, and a frame 202 configured to support engine 122 and generator 124

Frame 118 comprises attachment features 124/126, where a first set of attachment features 124/126 from attachment features 124/126 are positioned on frame 118 to mechanically couple frame 118 of first type of secondary module 104 having different dimensions than primary module 102 to frame 118 of primary module 102, and a second set of attachment features 124/126 from attachment features 124/126 are positioned on frame 118 to mechanically couple a frame of a second type of secondary module 104 having substantially the same dimensions as primary module 102 to frame 118 of primary module 102. The operator may mechanically couple the first set of attachment features 124/126 to corresponding attachment features of the frame of the first type of secondary module 104 (502).

Figure 6:
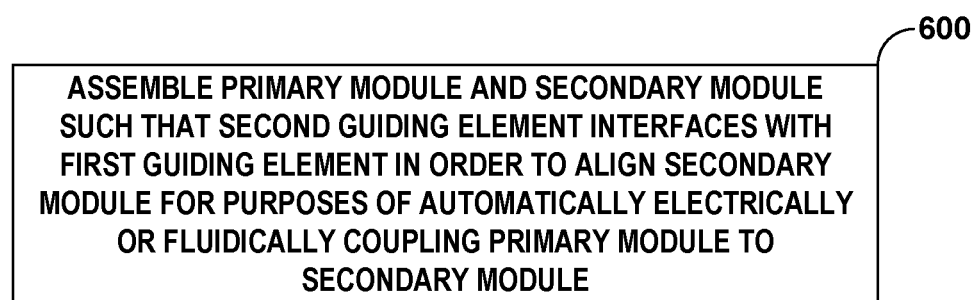
FIG. 6 is a flowchart illustrating further example operation of the modular generator set system shown in the examples of FIGS. 1-4G.

FIG. 6 is a flowchart illustrating further example assembly of the modular generator set system shown in the examples of FIGS. 1-4G. As described above, operators may assemble a primary module 102 (FIG. 1) of a generator set system and a secondary module 104 of generator set system 100, wherein primary module 102 includes an engine 122, a generator 124 coupled to engine 122 and configured to convert mechanical energy of engine 122 to electrical energy, a primary frame 202 (FIG. 2A) configured to support engine 122 and generator 124, and guiding elements 406 (FIG. 4A).

Secondary module 104 includes one or more of the various secondary modules 104 shown in the example of FIG. 1. Secondary module 104 includes a secondary frame 404 and guiding elements 408 that is reciprocal to guiding elements 406. The operator assembles primary module 102 and secondary module 104 such that guiding elements 408 interface with guiding elements 406 in order to align secondary module 104 for purposes of automatically electrically or fluidically coupling primary module 102 to secondary module 104 (600).

Various aspects of the techniques may, in this respect, provide for the following clauses:

Clause 1A. A power generation system comprising: a primary module comprising: a generator set configured to convert fuel into electrical energy; a housing configured to support the generator set; a cooling connector; and a power connector; and a plurality of secondary modules including a cooling system module, the cooling system module comprising: a radiator; a housing; and a cooling connector configured to exchange cooling fluid with the cooling connector of the primary module.

Clause 2A. The power generation system of clause 1A, wherein the housing of the primary module and the housing of the cooling system module both comprise ISO containers.

Clause 3A. The power generation system of clause 1A or 2A, wherein the primary module further comprises a fuel connector, and wherein the plurality of secondary modules further includes a fuel system module, the fuel system module comprising: a fuel tank; a housing; and a fuel connector configured to provide fuel to the fuel connector of the primary module.

Clause 4A. The power generation system of clause 3A, wherein the housing of the fuel system module comprises an ISO container.

Clause 5A. The power generation system of any one of clauses 1A-4A, wherein the primary module further comprises an exhaust output connector, wherein the plurality of secondary modules further includes an exhaust module, the exhaust module comprising: a housing; an exhaust intake connector configured to receive exhaust gases from the exhaust output connector of the primary module; an exhaust treatment system configured to process the received exhaust gases into treated exhaust gases; and an exhaust output connector configured to provide the treated exhaust gases to a chimney.

Clause 6A. The power generation system of clause 5A, wherein the housing of the exhaust module comprises an ISO container.

Clause 7A. The power generation system of clause 6A, wherein the chimney comprises at least one ISO container.

Clause 8A. The power generation system of any one of clauses 1A-7A, wherein the primary module comprises a first primary module, wherein the cooling connector of the cooling system module comprises a first cooling connector, and wherein the cooling system module further comprises a second cooling connector configured to exchange cooling fluid with a cooling connector of a second primary module.

Clause 9A. The power generation system of any one of clauses 1A-8A, wherein the plurality of secondary modules further includes at least one of a heat recovery module, a solar power module, a battery module, an electrical system module, an air intake module, or an air outlet module.

Clause 1B. A generator set system comprising: a primary module comprising: an engine; a generator coupled to the engine and configured to convert mechanical energy of the engine to electrical energy; and a frame configured to support the engine and the generator, wherein: the frame comprises a plurality of attachment features, a first set of attachment features from the plurality of attachment features are positioned on the frame to mechanically couple a frame of a first type of secondary module having substantially the same dimensions as the primary module to the frame of the primary module, and a second set of attachment features from the plurality of attachment features are positioned on the frame to mechanically couple a frame of a second type of secondary module having different dimensions than the primary module to the frame of the primary module.

Clause 2B. The generator set system of clause 1B, wherein the frame of the primary module, the frame of the first type of secondary module, and the frame of the second type of secondary module substantially conform to ISO container dimensions.

Clause 3B. The generator set system of clause 1B or 2B, wherein the frame of the primary module substantially conforms to 40-foot ISO container dimensions.

Clause 4B. The generator set system of any one of clauses 1B to 3B, wherein the second type of secondary attachment module conforms to 8, 10, or 20-foot ISO container dimensions.

Clause 5B. The generator set system of any one of clauses 1B to 4B, wherein the frame of the primary container is configured to couple to removable side panels configured to enclose the engine and the generator during transport and configured to be removed prior to mechanically coupling a secondary module to the frame of the primary module.

Clause 6B. The generator set system of any one of clauses 1B to 5B, wherein each attachment feature of the plurality of attachment features comprises a mechanical support configured to mechanically support a frame of a secondary module and a coupling feature configured to mechanically lock the frame of the secondary module to the frame of the primary module.

Clause 7B. The generator set system of clause 6B, wherein the coupling feature is configured to receive a cotter pin, a clamp, or a double ended twist lock.

Clause 8B. The generator set system of any one of clauses 1B to 7B, wherein the primary module further comprises a primary electrical coupling, and wherein the primary electrical coupling is attached to the frame of the primary module near one of the attachment features.

Clause 9B. The generator set system of clause 8B, wherein the first type of secondary module further comprises a secondary electrical coupling configured to couple to the primary electrical coupling, and wherein the secondary electrical coupling is attached to the frame of the first type of secondary module at a location complementary to the location at which the primary electrical coupling is attached to the frame of the primary module.

Clause 10B. The generator set system of clause 8B or 9B, wherein the primary electrical coupling comprises a communication coupling or a power coupling.

Clause 11B. The generator set system of any one of clauses 1B to 10B, wherein the primary module further comprises a primary fluid coupling, and wherein the primary fluid coupling is attached to the frame of the primary module near one of the attachment features.

Clause 12B. The generator set system of clause 11B, wherein the first type of secondary module further comprise a secondary fluid coupling configured to couple to the primary fluid coupling, and wherein the secondary fluid coupling is attached to the frame of the first type of secondary module at a location complementary to the location at which the primary fluid coupling is attached to the frame of the primary module.

Clause 13B. The generator set system of clause 11B or 12B, wherein the fluid coupling comprises a coupling of a fuel line, an exhaust conduit, a heat exchanger working fluid line, or an air conduit.

Clause 14B. The generator set system of any one of clauses 1B to 13B, wherein the first type of secondary module and the second type of secondary module comprise at least one of a heat recovery module, an exhaust module, a cooling system module, a fuel system module, a solar power module, a battery module, an electrical system module, an air intake module, or an air outlet module.

Clause 15B. A method comprising: stacking a frame of a first type of secondary module on a frame of a primary module, wherein the primary module comprises: an engine; a generator coupled to the engine and configured to convert mechanical energy of the engine to electrical energy; and a frame configured to support the engine and the generator, wherein: the frame comprises a plurality of attachment features, a first set of attachment features from the plurality of attachment features are positioned on the frame to mechanically couple the frame of the first type of secondary module having different dimensions than the primary module to the frame of the primary module, and a second set of attachment features from the plurality of attachment features are positioned on the frame to mechanically couple a frame of a second type of secondary module having substantially the same dimensions as the primary module to the frame of the primary module; and mechanically coupling the first set of attachment features to corresponding attachment features of the frame of the first type of secondary module.

Clause 16B. The method of clause 15B, wherein the frame of the primary module, the frame of the first type of secondary module, and the frame of the second type of secondary module substantially conform to ISO container dimensions.

Clause 17B. The method of clause 15B or 16B, wherein the frame of the primary module substantially conforms to 40-foot ISO container dimensions.

Clause 18B. The method of any one of clauses 15B to 17B, wherein the second type of secondary attachment module conforms to 8, 10, or 20-foot ISO container dimensions.

Clause 19B. The method of any one of clauses 15B to 18B, further comprising: removing removable side panels from the frame of the primary module prior to stacking the frame of the first type of secondary module on the frame of the primary module.

Clause 20B. The method of any one of clauses 15B to 19B, wherein each attachment feature of the plurality of attachment features comprises a mechanical support configured to mechanically support a frame of a secondary module and a coupling feature configured to mechanically lock the frame of the secondary module to the frame of the primary module.

Clause 21B. The method of clause 20B, wherein further comprising inserting a cotter pin, a clamp, or a double ended twist lock in the coupling feature to mechanically lock the primary module to the first type of secondary module.

Clause 22B. The method of any one of clauses 15B to 21B, wherein the primary module further comprises a primary electrical coupling, and wherein the primary electrical coupling is attached to the frame of the primary module near one of the attachment features.

Clause 23B. The method of clause 22B, wherein the first type of secondary module further comprises a secondary electrical coupling configured to couple to the primary electrical coupling, and wherein the secondary electrical coupling is attached to the frame of the first type of secondary module at a location complementary to the location at which the primary electrical coupling is attached to the frame of the primary module, further comprising connecting the primary electrical coupling to the secondary electrical coupling.

Clause 24B. The method of clause 22B or 23B, wherein the primary electrical coupling comprises a communication coupling or a power coupling.

Clause 25B. The method of any one of clauses 15B to 24B, wherein the primary module further comprises a primary fluid coupling, and wherein the primary fluid coupling is attached to the frame of the primary module near one of the attachment features.

Clause 26B. The method of clause 25B, wherein the first type of secondary module further comprise a secondary fluid coupling configured to couple to the primary fluid coupling, and wherein the secondary fluid coupling is attached to the frame of the first type of secondary module at a location complementary to the location at which the primary fluid coupling is attached to the frame of the primary module, further comprising connecting the primary fluid coupling to the secondary fluid coupling.

Clause 27B. The method of clause 25B or 26B, wherein the fluid coupling comprises a coupling of a fuel line, an exhaust conduit, a heat exchanger working fluid line, or an air conduit.

Clause 28B. The method of any one of clauses 15 to 27, wherein the first type of secondary module and the second type of secondary module comprise at least one of a heat recovery module, an exhaust module, a cooling system module, a fuel system module, a solar power module, a battery module, an electrical system module, an air intake module, or an air outlet module.

Clause 1C. A generator set system comprising: a primary module comprising: an engine; a generator coupled to the engine and configured to convert mechanical energy of the engine to electrical energy; a primary frame configured to support the engine and the generator; and a first guiding element; a secondary module comprising: at least one of a heat recovery module, an exhaust module, a cooling system module, a fuel system module, a solar power module, a battery module, an electrical system module, an air intake module, or an air outlet module; a secondary frame; and a second guiding element that is reciprocal to the first guiding element such that, during installation of the secondary module, the second guiding element is configured to interface with the first guiding element to align the secondary module for purposes of automatically electrically or fluidically coupling the primary module to the secondary module upon assembling the primary frame and the secondary frame.

Clause 2C. The generator set system of clause 1C, wherein the first guiding element is attached to the primary frame, and wherein the second guiding element is attached to the secondary frame.

Clause 3C. The generator set system of any combination of clauses 1C and 2C, wherein the first guiding element comprises a rail, and wherein the second guiding element comprises a carriage.

Clause 4C. The generator set system of clause 3C, wherein the first guiding element comprises a slot rail that includes a groove, and wherein the carriage is configured to be inserted inside the groove.

Clause 5C. The generator set system of clause 3C, wherein the groove comprises a trapezoidal groove running a length of the slot rail.

Clause 6C. The generator set system of clause 3C, wherein the first guiding element comprises a linear rail, and wherein the carriage comprises a sleeve carriage configured to interface with the linear rail such that the sleeve carriage surrounds at least a portion of the linear rail.

Clause 7C. The generator set system of any combination of clauses 1C-6C, wherein automatically electrical coupling of the primary module to the second module includes an electrical coupling to provide an electrical power connection between the primary module and the secondary module.

Clause 8C. The generator set system of any combination of clauses 1C-6C, wherein automatically electrical coupling of the primary module to the second module includes an electrical communication connection between the primary module and the secondary module.

Clause 9C. The generator set system of any combination of clauses 1C-8C, wherein automatically fluidically coupling the primary module to the second module includes one or more couplings of a fuel line, an exhaust conduit, a heat exchanger working fluid line, and an air conduit.

Clause 10C. The generator set system of any combination of clauses 1C-9C, wherein the first guiding element is pre-installed on the primary frame and fold out from the primary frame, and wherein the second guiding element is pre-installed on the secondary frame and fold out from the secondary frame.

Clause 11C. The generator set system of any combination of clauses 1C-9C, wherein the first guiding element is separate from the primary frame and configured to be installed during assembly of the primary frame, and wherein the second guiding element is separate from the secondary frame and configured to be installed during assembly of the secondary frame.

Clause 12C. A method comprising: assembling a primary module of a generator set system and a secondary module of the generator set system, wherein the primary module comprises: an engine; a generator coupled to the engine and configured to convert mechanical energy of the engine to electrical energy; a primary frame configured to support the engine and the generator; and a first guiding element; the secondary module comprises: at least one of a heat recovery module, an exhaust module, a cooling system module, a fuel system module, a solar power module, a battery module, an electrical system module, an air intake module, or an air outlet module; a secondary frame; and a second guiding element that is reciprocal to the first guiding element, wherein assembling primary module and the secondary module causes the second guiding element to interface with the first guiding element in order to align the secondary module for purposes of automatically electrically or fluidically coupling the primary module to the secondary module.

Clause 13C. The method of clause 12C, wherein the first guiding element is attached to the primary frame, and wherein the second guiding element is attached to the secondary frame.

Clause 14C. The method of any combination of clauses 12C and 13C, wherein the first guiding element comprises a rail, and wherein the second guiding element comprises a carriage.

Clause 15C. The method of clause 14C, wherein the first guiding element comprises a slot rail that includes a groove, and wherein the carriage is configured to be inserted inside the groove.

Clause 16C. The method of clause 14C, wherein the groove comprises a trapezoidal groove running a length of the slot rail.

Clause 17C. The method of clause 14C, wherein the first guiding element comprises a linear rail, and wherein the carriage comprises a sleeve carriage configured to interface with the linear rail such that the sleeve carriage surrounds at least a portion of the linear rail.

Clause 18C. The method of any combination of clauses 12C-17C, wherein automatically electrical coupling of the primary module to the second module includes an electrical coupling to provide an electrical power connection between the primary module and the secondary module.

Clause 19C. The method of any combination of clauses 12C-17C, wherein automatically electrical coupling of the primary module to the second module includes an electrical communication connection between the primary module and the secondary module.

Clause 20C. The method of any combination of clauses 12C-19C, wherein automatically fluidically coupling the primary module to the second module includes one or more couplings of a fuel line, an exhaust conduit, a heat exchanger working fluid line, and an air conduit.

Clause 21C. The method of any combination of clauses 12C-20C, wherein the first guiding element is pre-installed on the primary frame and fold out from the primary frame, and wherein the second guiding element is pre-installed on the secondary frame and fold out from the secondary frame.

Clause 22C. The method of any combination of clauses 12C-20C, wherein the first guiding element is separate from the primary frame and configured to be installed during assembly of the primary frame, and wherein the second guiding element is separate from the secondary frame and configured to be installed during assembly of the secondary frame.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A generator set system comprising:
a primary module comprising:
an engine;
a generator coupled to the engine and configured to convert mechanical energy of the engine to electrical energy;
a primary frame configured to support the engine and the generator; and
a first guiding element;
a secondary module comprising:
at least one of a heat recovery module, an exhaust module, a cooling system module, a fuel system module, a solar power module, a battery module, an electrical system module, an air intake module, or an air outlet module;
a secondary frame; and
a second guiding element that is reciprocal to the first guiding element such that, during installation of the secondary module, the second guiding element is configured to interface with the first guiding element to align the secondary module for purposes of automatically electrically or fluidically coupling the primary module to the secondary module upon assembling the primary frame and the secondary frame.

2. The generator set system of claim 1,
wherein the first guiding element is attached to the primary frame, and
wherein the second guiding element is attached to the secondary frame.

3. The generator set system of claim 1,
wherein the first guiding element comprises a rail, and
wherein the second guiding element comprises a carriage.

4. The generator set system of claim 3,
wherein the first guiding element comprises a slot rail that includes a groove, and
wherein the carriage is configured to be inserted inside the groove.

5. The generator set system of claim 3, wherein the groove comprises a trapezoidal groove running a length of the slot rail.

6. The generator set system of claim 3,
wherein the first guiding element comprises a linear rail, and
wherein the carriage comprises a sleeve carriage configured to interface with the linear rail such that the sleeve carriage surrounds at least a portion of the linear rail.

7. The generator set system of claim 1, wherein automatically electrical coupling of the primary module to the second module includes an electrical coupling to provide an electrical power connection between the primary module and the secondary module.

8. The generator set system of claim 1, wherein automatically electrical coupling of the primary module to the second module includes an electrical communication connection between the primary module and the secondary module.

9. The generator set system of claim 1, wherein automatically fluidically coupling the primary module to the second module includes one or more couplings of a fuel line, an exhaust conduit, a heat exchanger working fluid line, and an air conduit.

10. The generator set system of claim 1,
wherein the first guiding element is pre-installed on the primary frame and fold out from the primary frame, and
wherein the second guiding element is pre-installed on the secondary frame and fold out from the secondary frame.

11. The generator set system of claim 1,
wherein the first guiding element is separate from the primary frame and configured to be installed during assembly of the primary frame, and
wherein the second guiding element is separate from the secondary frame and configured to be installed during assembly of the secondary frame.

12. A method comprising:
assembling a primary module of a generator set system and a secondary module of the generator set system, wherein
the primary module comprises:
an engine;
a generator coupled to the engine and configured to convert mechanical energy of the engine to electrical energy;
a primary frame configured to support the engine and the generator; and
a first guiding element;
the secondary module comprises:
at least one of a heat recovery module, an exhaust module, a cooling system module, a fuel system module, a solar power module, a battery module, an electrical system module, an air intake module, or an air outlet module;
a secondary frame; and
a second guiding element that is reciprocal to the first guiding element,
wherein assembling primary module and the secondary module causes the second guiding element to interface with the first guiding element in order to align the secondary module for purposes of automatically electrically or fluidically coupling the primary module to the secondary module.

13. The method of claim 12,
wherein the first guiding element is attached to the primary frame, and
wherein the second guiding element is attached to the secondary frame.

14. The method of claim 12,
wherein the first guiding element comprises a rail, and
wherein the second guiding element comprises a carriage.

15. The method of claim 14,
wherein the first guiding element comprises a slot rail that includes a groove, and
wherein the carriage is configured to be inserted inside the groove.

16. The method of claim 14, wherein the groove comprises a trapezoidal groove running a length of the slot rail.

17. The method of claim 14,
wherein the first guiding element comprises a linear rail, and
wherein the carriage comprises a sleeve carriage configured to interface with the linear rail such that the sleeve carriage surrounds at least a portion of the linear rail.

18. The method of claim 12, wherein automatically electrical coupling of the primary module to the second module includes an electrical coupling to provide an electrical power connection between the primary module and the secondary module.

19. The method of claim 12, wherein automatically electrical coupling of the primary module to the second module includes an electrical communication connection between the primary module and the secondary module.

20. The method of claim 12, wherein automatically fluidically coupling the primary module to the second module includes one or more couplings of a fuel line, an exhaust conduit, a heat exchanger working fluid line, and an air conduit.

* * * * *